United States Patent
Fukano

(10) Patent No.: US 6,752,375 B2
(45) Date of Patent: Jun. 22, 2004

(54) SOLENOID-OPERATED VALVE

(75) Inventor: Yoshihiro Fukano, Moriya (JP)

(73) Assignee: SMC Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/214,608

(22) Filed: Aug. 9, 2002

(65) Prior Publication Data
US 2003/0030020 A1 Feb. 13, 2003

(30) Foreign Application Priority Data
Aug. 10, 2001 (JP) .................................. 2001-244535

(51) Int. Cl.⁷ .............................................. F16K 31/02
(52) U.S. Cl. ............................... 251/129.17; 251/331
(58) Field of Search ....................... 251/129.15, 129.17, 251/331, 335.2

(56) References Cited
U.S. PATENT DOCUMENTS 2,283,903 A * 5/1942 Ashcraft ................ 251/129.15
4,683,454 A * 7/1987 Vollmer et al. ......... 251/129.15
5,875,922 A * 3/1999 Chastine et al. ........ 251/129.15
6,179,005 B1 * 1/2001 Inami ..................... 251/129.08
6,527,249 B2 * 3/2003 Niimi et al. ............ 251/129.15

FOREIGN PATENT DOCUMENTS

| DE | 297 23 707 | 2/1999 |
| DE | 100 56 200 | 7/2001 |
| JP | 3-61776 | 3/1991 |

* cited by examiner

Primary Examiner—John Bastianelli
(74) Attorney, Agent, or Firm—Paul A. Guss

(57) ABSTRACT

A solenoid-operated valve includes a bonnet, a cap member which is disposed in the bonnet, a fixed iron core which is connected to a central portion of the cap member, a movable iron core which is provided under the fixed iron core, which is displaceable under the exciting action of a coil, and which has an inclined surface having gradually contracted diameters, an annular sleeve which is disposed to surround an outer circumferential surface of the movable iron core, and a spring member which is interposed between an annular projection of the movable iron core and an annular groove of the sleeve.

4 Claims, 6 Drawing Sheets

Prior Art

US 6,752,375 B2

SOLENOID-OPERATED VALVE

BACKGROUND OF THE INVENTION

1. Field of the Invention

The present invention relates to a solenoid-operated valve having the durability improved by reducing sliding resistance of a movable iron core when a solenoid is excited to displace the movable iron core.

2. Description of the Related Art

A solenoid-operated valve has been used to supply a pressure fluid to an actuator or discharge a compressed air to an atmospheric air so that a flow direction of the compressed air may be controlled. Generally, the solenoid-operated valve has a valve plug operated by a solenoid (electromagnet).

As shown in FIG. 6, a conventional solenoid-operated valve of the above type comprises a coil housing 5 and a valve body 9. The coil housing 5 houses therein a fixed iron core 1, a coil 2, a movable iron core (plunger) 3, a magnetic plate 4 or the like. The valve body 9 includes a diaphragm 8 for opening/closing a valve seat 7. A pair of fluid inlet/outlet ports 6a, 6b are communicated with each other by the valve seat 7 (see Japanese Laid-Open Patent Publication No. 3-61776).

A clearance E (air gap) is formed between the outer circumferential surface of the movable iron core 3 and the inner circumferential surface of the annular magnetic plate 4. An attracting force of the magnetic plate 4 attracts the movable iron core 3 radially outwardly.

SUMMARY OF THE INVENTION

It is a general object of the present invention to provide a solenoid-operated valve which reduces sliding resistance of a movable iron core to a sleeve when the movable iron core is displaced, thereby enabling the movable iron core to slide more smoothly without lowering a force of a solenoid for attracting the movable iron core.

A principal object of the present invention is to provide a solenoid-operated valve which prevents dust or the like from being generated at a sliding portion of a movable iron core.

The above and other objects, features, and advantages of the, present invention will become more apparent from the following description when taken in conjunction with the accompanying drawings in which a preferred embodiment of the present invention is shown by way of illustrative, example.

DESCRIPTION OF THE PREFERRED EMBODIMENTS

Figure 1:
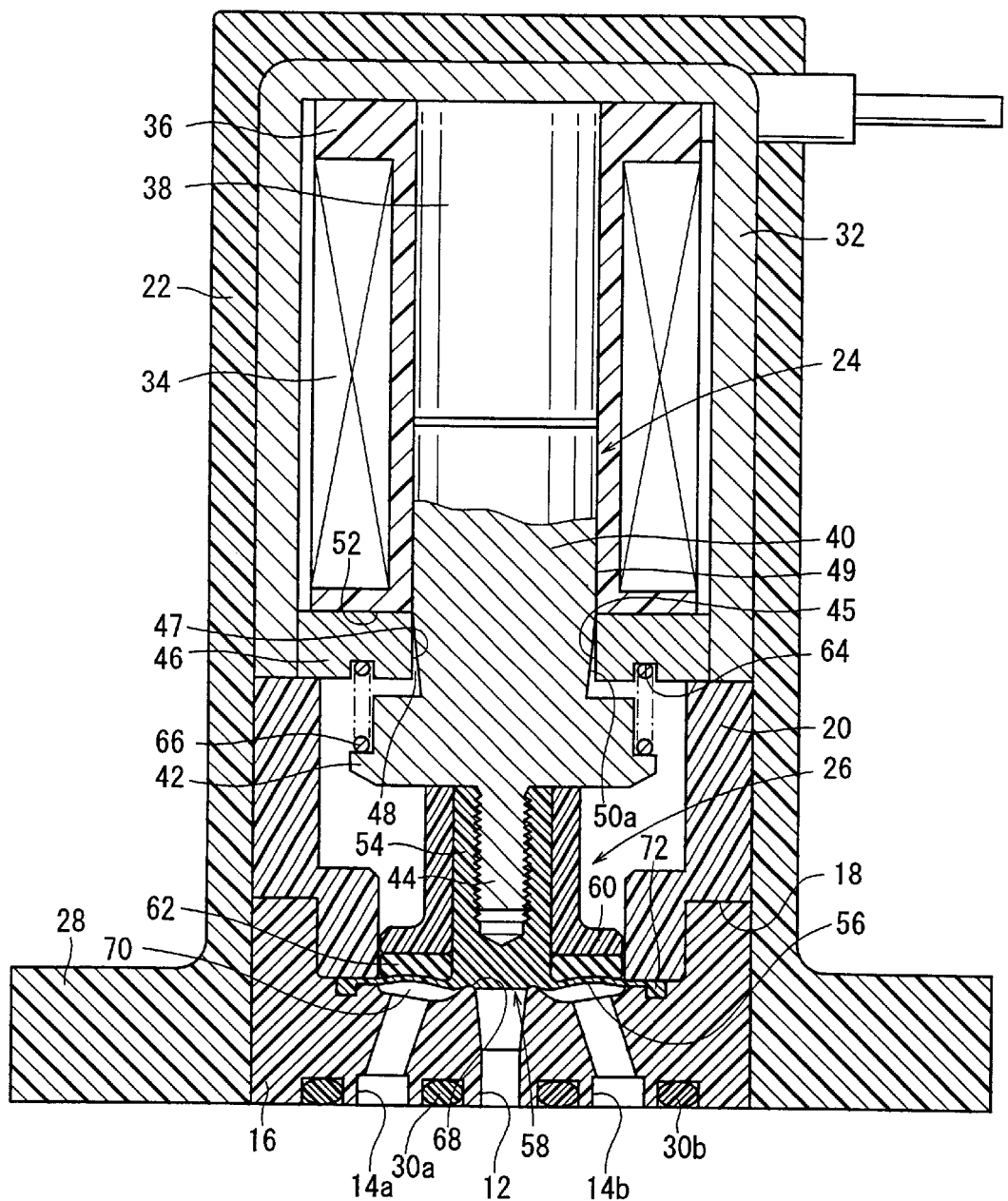
FIG. 1 is a vertical sectional view illustrating a closed state of a solenoid-operated valve according to an embodiment of the present invention.

As shown in FIG. 1, a solenoid-operated valve 10 according to an embodiment of the present invention comprises a first valve body 16 and a cylindrical second valve body 20. The first valve body 16 has a pressure fluid supply port 12 formed at a central position and a pair of pressure fluid discharge ports 14a, 14b formed at right and left positions adjacent to the pressure fluid supply port 12 interposed between the pair of pressure fluid discharge ports 14a, 14b. The cylindrical second valve body 20 is integrally connected to an upper portion of the first valve body 16 by an annular step 18.

The solenoid-operated valve 10 further comprises a bottom-equipped cylindrical bonnet 22, a solenoid section 24 and a valve mechanism section 26. The bottom-equipped cylindrical bonnet 22 is integrally connected to sides of the first and second valve bodies 16, 20. The solenoid section 24 is disposed in the bonnet 22. The solenoid section 24 is excited so that the valve mechanism section 26 may switch the pressure fluid supply port 12 and the pressure fluid discharge ports 14a, 14b from a communication state to a non-communication state or from the non-communication state to the communication state.

A flange 28 is formed at a lower portion of the bonnet 22. Bolts (not shown) are inserted into attachment holes (not shown) of the flange 28 so that the solenoid-operated valve 10 can be fixed to another member (not shown). Seal members 30a, 30b are installed to annular grooves formed near the pressure fluid supply port 12 and the pressure fluid discharge ports 14a, 14b respectively.

The solenoid section 24 is composed of a bottom-equipped cylindrical cap member 32, a bobbin 36, a fixed iron core 38 and a movable iron core 40. The bottom-equipped cylindrical cap member 32 is internally fitted to the bonnet 22 and is formed of a metal material. The bobbin 36 is disposed in the cap member 32. A coil 34 is wound around the bobbin 36. The fixed iron core 38 has an end connected to the cap member 32. The movable iron core 40 is urged in a direction away from the fixed iron core 38 by the spring force of a spring member 66 as described later on.

An annular projection 42 is formed at a lower portion of the movable iron core 40. The annular projection 42 has diameters expanded radially outwardly and has a circumferential surface. A rod section 44 protruding downwardly is formed at a center of an end of the annular projection 42 of the movable iron core 40.

An annular sleeve 46 formed of a magnetic material is interposed between the second valve body 20 and the bobbin 36 under the coil 34. A hole 45 is formed at a center of the sleeve 46. The movable iron core 40 is inserted through the hole 45.

A clearance 48 (air gap) is formed between an inner circumferential surface 47 of the hole 45 of the sleeve 46 and an outer circumferential surface 49 of the movable iron core 40.

Figure 3:
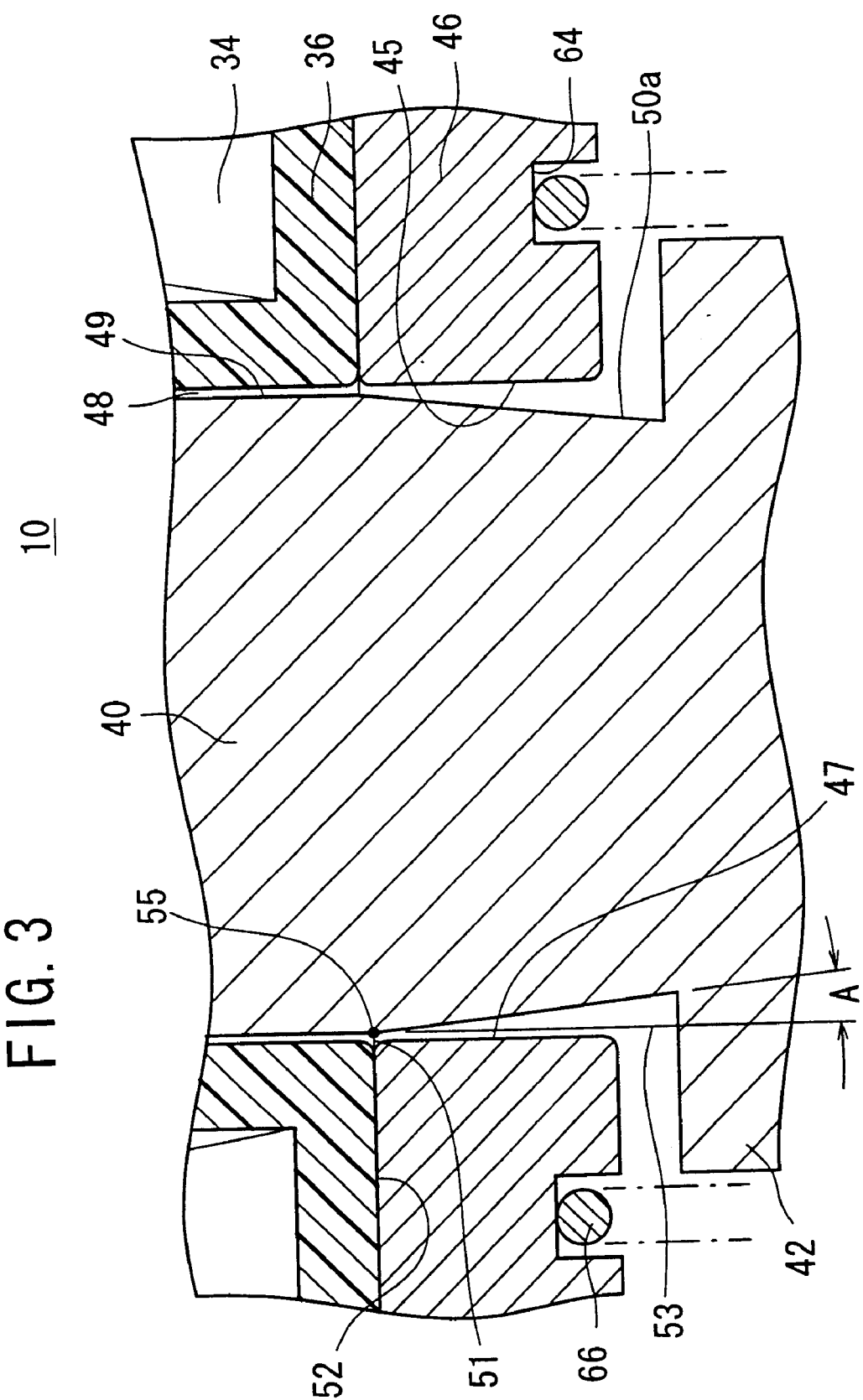
FIG. 3 is a partial magnified view illustrating an inclined surface of a movable iron core when the solenoid-operated valve shown in FIG. 1 is closed.

A tapered inclined surface (tapered surface) 50a, which has diameters gradually contracted toward the annular projection 42, is formed at a position where the movable iron core 40 is opposed to the sleeve 46. As shown in FIG. 3, a contact plane 52 is formed between the sleeve 46 and the bobbin 36. FIG. 1 shows a non-excited state in which the coil 34 is not supplied with an electric current. In the non-excited state, the inclined surface 50a is inclined by an angle of inclination A toward an axial center of the movable iron core 40 from a point of intersection 55. The point of intersection 55 is located at a position where an extension line 51 of the contact plane 52 as an end surface contacting the solenoid intersects with an extension line 53 of the outer circumferential surface 49 of the movable iron core 40 (see FIG. 3). When the angle of inclination A is set within a range of about 1° to 50°, it is possible to obtain approximately the same attracting force as the force of attracting the conventional movable iron core 3 having no tapered shape.

Figure 5:
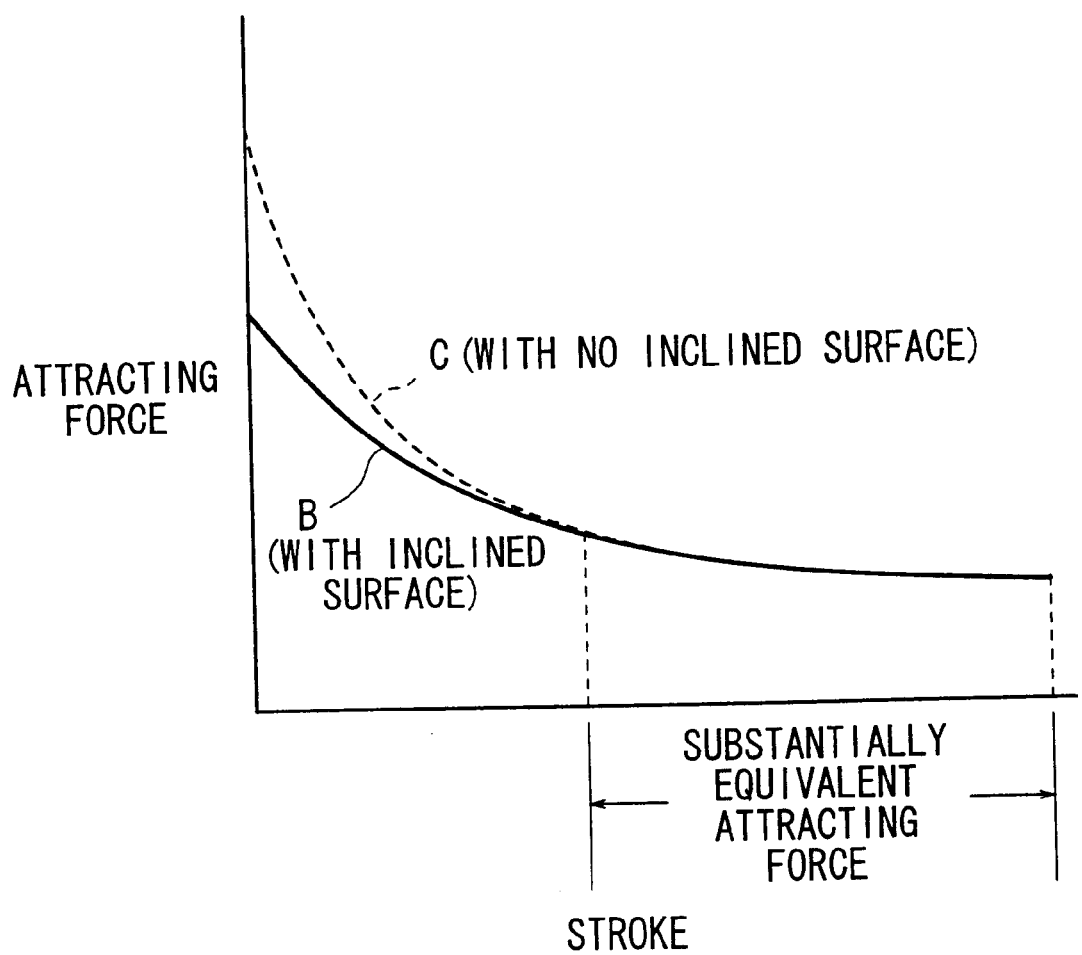
FIG. 5 shows characteristic curves illustrating relationship between an attracting force and a stroke of the solenoid-operated valve shown in FIG. 1.
Figure 6:
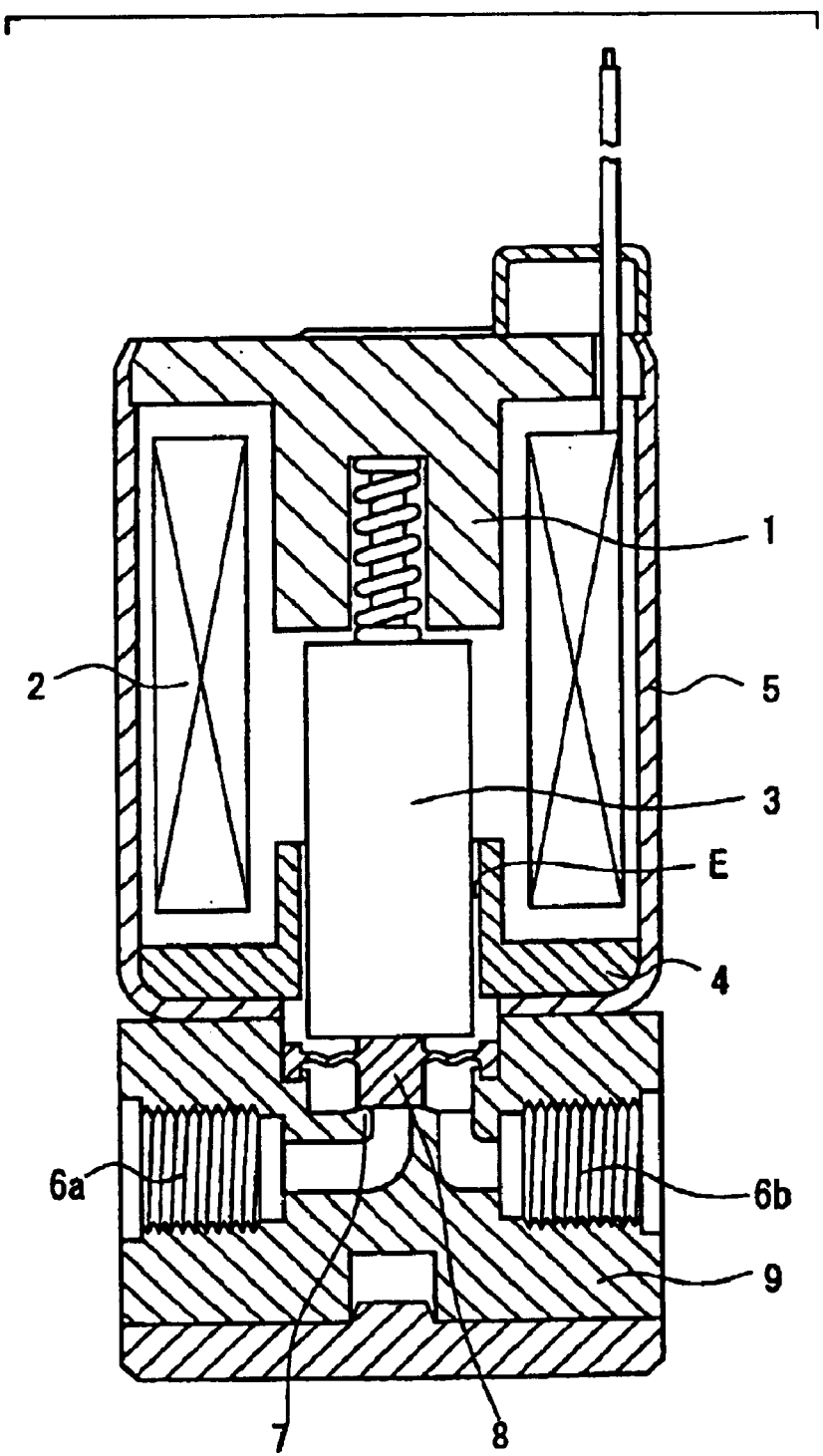
FIG. 6 is a vertical sectional view illustrating a conventional solenoid-operated valve.

FIG. 5 shows relationship between a stroke of the movable iron core 40 and an attracting force of the entire solenoid section 24 on the assumption that the movable iron core 40 has the tapered inclined surface 50a (see Solid Line B) and that the movable iron core 40 has no tapered inclined surface 50a (see Broken Line C). In the embodiment of the present invention, the solenoid-operated valve 10 is used within a range of the stroke of the movable iron core 40 in which the characteristic curves of Solid Line B and Broken Line C are substantially overlapped with each other. Therefore, it is possible to obtain the substantially equivalent attracting force as compared with the conventional solenoid-operated valve including the movable iron core 3 having no inclined surface 50a.

Figure 4:
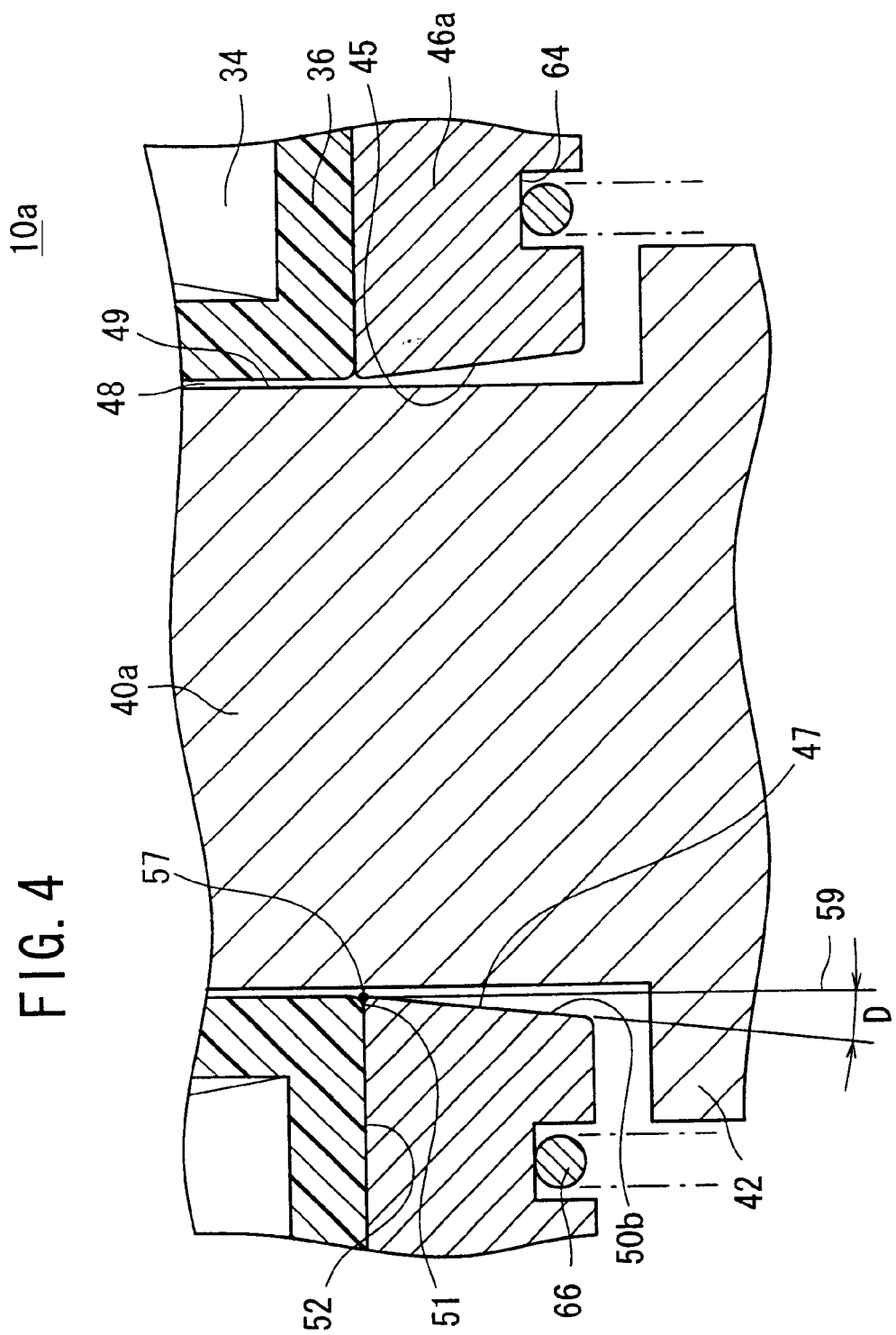
FIG. 4 is a partial magnified view illustrating an inclined surface of a sleeve when a solenoid-operated valve according to a modified embodiment is closed.

In a solenoid-operated valve 10a according to a modified embodiment shown in FIG. 4, a sleeve 46a has an inner circumferential surface 47 including a tapered inclined surface 50b whose diameters are gradually expanded in a direction away from the bobbin 36. A movable iron core 40a has an outer circumferential surface 49 opposed to the inclined surface 50b. The outer circumferential surface 49 has a diameter substantially identical over the entire length in the axial direction of the movable iron core 40a.

Therefore, it is possible for the solenoid-operated valve 10a according to the modified embodiment to obtain the substantially equivalent attracting force as compared with the conventional solenoid-operated valve in the same manner as in the solenoid-operated valve 10. As shown in FIG. 4, a contact surface 52 is formed between the sleeve 46 and the bobbin 36. In the non-excited state in which the coil 34 is not supplied with the electric current as shown in FIG. 1, the inclined surface 50b is inclined by an angle of inclination D toward the sleeve 46a from a point of intersection 57. The point of intersection 57 is located at a position where an extension line 51 of the contact plane 52 as an end surface contacting the solenoid intersects with an extension line 59 of the inner circumferential surface of the bobbin 36 (see FIG. 4). When the angle of inclination D is set within a range of about 1° to 50°, it is possible to obtain approximately the same attracting force as the force of attracting the conventional movable iron core 3 having no tapered shape.

As shown in FIG. 3, the movable iron core 40 has the outer circumferential surface 49. The outer circumferential surface 49 includes the inclined surface 50a at the position where the outer circumferential surface 49 is opposed to the inner circumferential surface 47 of the sleeve 46. The inclined surface 50a has the diameters gradually contracted toward the annular projection 42. Therefore, the contact area between the outer circumferential surface 49 of the movable iron core 40 and the inner circumferential surface 47 of the sleeve 46 can be decreased. Accordingly, it is possible to reduce the sliding resistance of the movable iron core 40, and it is possible to prevent the generation of dust or the like which would be otherwise caused by the contact.

Similarly, as shown in FIG. 4, the sleeve 46a has the inner circumferential surface 47 including the inclined surface 50b. The inclined surface 50b has the diameters gradually expanded in the direction away from the bobbin 36. Therefore, the contact area between the outer circumferential surface 49 of the movable iron core 40a and the inner circumferential surface 47 of the sleeve 46a can be decreased. Accordingly, it is possible to reduce the sliding resistance of the movable iron core 40a, and it is possible to prevent the generation of dust or the like which would be otherwise caused by the contact.

As shown in FIG. 1, the valve mechanism section 26 is composed of a shaft section 54 which is formed of a resin material and which is connected to the rod section 44 of the movable iron core 40 by using a screw, a diaphragm (valve plug) 58 which is integrally formed at a lower end of the shaft section 54 and which has a skirt 56 extending radially outwardly, a displacement member 60 which is integrally installed to the outer circumference of the shaft section 54, an elastic member 62 which is interposed between the displacement member 60 and the diaphragm 58 and which is formed of an elastic material such as rubber to protect the skirt 56, and a spring member 66 which is interposed between an annular groove 64 of the sleeve 46 and the annular projection 42 of the movable iron core 40 and which urges the movable iron core 40 in a direction away from the fixed iron core 38.

The diaphragm 58 is seated on or spaced from a seat section 68 of the first valve body 16, thereby opening or closing a passage 70 through which the pressure fluid supply port 12 and the pressure fluid discharge ports 14a, 14b are communicated with each other.

The circumferential edge of the skirt 56 of the diaphragm 58 is inserted and interposed in an annular recess 72 formed by the first valve body 16 and the second valve body 20.

The solenoid-operated valve 10 according to the embodiment of the present invention is basically constructed as described above. Next, its operation, function, and effect will be explained.

FIG. 1 depicts the non-excited state in which no current is supplied to the coil 34, illustrating the OFF state in which the diaphragm 58 is seated on the seat section 68, and the communication between the pressure fluid supply port 12 and the pressure fluid discharge ports 14a, 14b is blocked.

Figure 2:
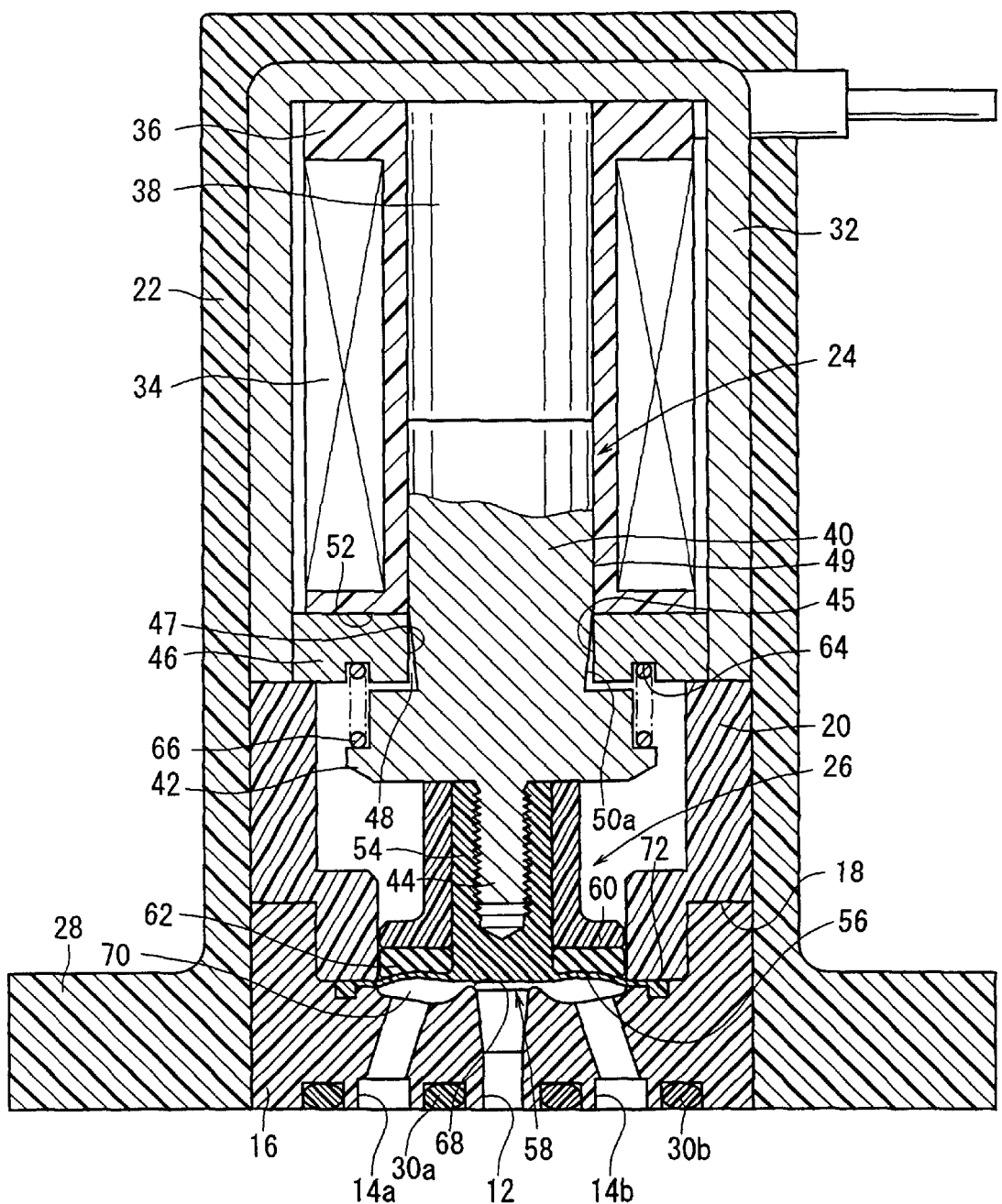
FIG. 2 is a vertical sectional view illustrating an open state of the solenoid-operated valve shown in FIG. 1.

A power source (not shown) is energized to apply the electric power to the coil 34. The coil 34 is excited so that the movable iron core 40 may be magnetically attracted toward the fixed iron core 38. As shown in FIG. 2, the solenoid-operated valve 10 is switched from the OFF state to the ON state.

That is, the movable iron core 40 is displaced by a minute distance toward the fixed iron core 38 against the spring force of the spring member 66, and the displacement member 60 is moved upwardly together with the movable iron core 40. Then, the upper end of the movable iron core 40 abuts against the lower end of the fixed iron core 38 in the displacement terminal end position.

Therefore, the movable iron core 40 is displaced to separate the diaphragm 58 from the seat section 68. The pressure fluid supply port 12 and the pressure fluid discharge ports 14a, 14b are communicated with each other in the ON state. Consequently, the pressure fluid is introduced from the pressure fluid supply port 12 past the gap between the diaphragm 58 and the seat section 68, flows through the passage 70 and the pressure fluid discharge ports 14a, 14b, and is supplied to the fluid pressure-operated apparatus (not shown).

As described above, in the embodiment of the present invention, one of the inclined surface 50a and the inclined surface 50b is provided. Specifically, the outer circumferential surface 49 of the movable iron core 40 includes the inclined surface 50a having the diameters gradually contracted toward the annular projection 42. Alternatively, the inner circumferential surface 47 of the sleeve 46 includes the inclined surface 50b having the diameters gradually expanded in the direction away from the bobbin 36. Accordingly, when the coil 34 is excited to axially displace the movable iron core 40, it is possible to reduce the contact area between the outer circumferential surface 49 of the movable iron core 40 and the inner circumferential surface 47 of the sleeve 46. Therefore, the sliding resistance of the movable iron core 40 can be reduced without lowering the attracting force of the coil 34.

Because the sliding resistance generated when the movable iron core 40 is displaced is reduced, it is possible to prevent the generation of dust or the like which would be otherwise caused by the contact between the outer circumferential surface 49 of the movable iron core 40 and the inner circumferential surface 47 of the sleeve 46. Therefore, it is possible to prevent any malfunction or the like which would be otherwise caused by the generation of dust or the like.

Consequently, it is possible to further improve durability of the solenoid-operated valve 10, enabling the solenoid-operated valve 10 to be used over a much longer period.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A solenoid-operated valve having a solenoid excited to magnetically attract a movable iron core for displacing a valve plug, said solenoid-operated valve comprising:

an annular sleeve being in contact with a bobbin around which a coil is wound, thereby defining a contact plane between said annular sleeve and said bobbin, said annular sleeve being composed of a magnetic member which surrounds an outer circumferential surface of said movable iron core, wherein said outer circumferential surface of said movable iron core includes a cylindrical surface and a tapered surface having diameters gradually reduced toward said valve plug at a position where said outer circumferential surface is substantially opposed to said sleeve, wherein an air gap is formed between said tapered surface of said movable iron core and an inner circumferential surface of said sleeve, such that in a non-excited state said tapered surface is inclined by an angle of inclination toward an axial center of said movable iron core from a point of intersection between said contact plane and an outer circumferential surface of said movable iron core.

2. The solenoid-operated valve according to claim 1, wherein said tapered surface is inclined within a range of angles of about 1° to 50° with respect to an axis of said movable iron core.

3. A solenoid-operated valve having a solenoid excited to magnetically attract a movable iron core for displacing a valve plug, said solenoid-operated valve comprising:

an annular sleeve being in contact with a bobbin around which a coil is wound, thereby defining a contact plane between said annular sleeve and said bobbin, said annular sleeve being composed of a magnetic member which surrounds an outer circumferential surface of said movable iron core, wherein said outer circumferential surface of said movable iron core is a non-tapered cylindrical surface, wherein an inner circumferential surface of said sleeve is a tapered surface having diameters gradually increasing toward said valve plug, and wherein an air gap is formed between said tapered surface of said sleeve and said outer circumferential surface of said movable iron core, such that in a non-excited state said tapered surface is inclined by an angle of inclination away from an axial center of said movable iron core from a point of intersection between said contact plane and an inner circumferential surface of said bobbin.

4. The solenoid-operated valve according to claim 3, wherein said tapered surface is inclined within a range of angles of about 1° to 50° with respect to an axis of said sleeve.

* * * * *